3,714,190
6-THIOCHROMAN-ACETIC-ACID COMPOUNDS
Jacques Robert Boissier, Paris, and Roger Ratouis, Saint-Cloud, France, assignors to Roussel-UCLAF, Paris, France
No Drawing. Filed Feb. 3, 1971, Ser. No. 112,407
Claims priority, application France, Feb. 10, 1970, 7004619
Int. Cl. A61k 27/00; C07d 65/08
U.S. Cl. 260—327 TH                                6 Claims

ABSTRACT OF THE DISCLOSURE

Novel condensed cyclic thio compounds of the formula

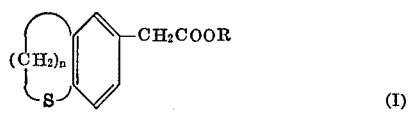

wherein $n$ is an integer from 2 to 4 and R is selected from the group consisting of hydrogen, alkyl and hydroxy alkyl of 1 to 5 carbon atoms and non-toxic, pharmaceutically acceptable metal salts and nitrogen base salts having analgesic, anti-inflammatory and anti-pyretic activity and their preparation.

OBJECTS OF THE INVENTION

It is an object of the invention to provide novel condensed cyclic thio compounds of Formula I.

It is another object of the invention to provide a novel process for the preparation of the compounds of Formula I.

It is a further object of the invention to provide novel analgésic, anti-inflammatory and anti-pyretic compositions.

It is an additional object of the invention to provide a novel method of treating pain, inflammation and fever in warm-blooded animals.

These and other objects and advantages of the invention will become obvious from the following detailed description.

THE INVENTION

The novel condensed cyclic thio compounds of the invention have the formula

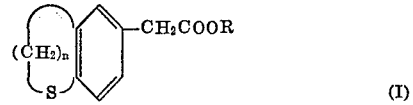

wherein $n$ is an integer from 2 to 4 and R is selected from the group consisting of hydrogen, alkyl and hydroxy alkyl of 1 to 5 carbon atoms and non-toxic, pharmaceutically acceptable metal salts and nitrogen base salts. Preferred acids are (2,3-dihydro-5-benzo[b]thiophene)-acetic acid, 6-thiochroman-acetic acid and (2,3,4,5-tetrahydro-7-benzo[b]thiepin)-acetic acid.

Examples of suitable metal salts of the said acids are those of alkali metals such as sodium, potassium or lithium; alkaline earth metals such as calcium or magnesium; or those of metals such as aluminium salt or salts of ammonium or of amines such as ethanolamine, diethanolamine, etc. The esters of the acids of Formula I may be derived from alkanols such as methanol, ethanol, the propanols, glycol or glycerol.

The novel process of the invention for the preparation of the compounds of Formula I comprises subjecting a condensed cyclic thio acetyl compound of the formula

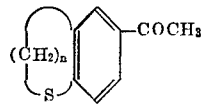

wherein $n$ has the above definition to the Willgerodt-Kindler reaction with sulfur and morpholine to obtain a thioamide of the formula

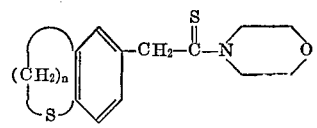

and hydrolyzing the latter with an alkaline hydroxide and acidifying the reaction mixture with a strong acid to obtain the corresponding condensed cyclic thio acid of Formula I wherein R is hydrogen. The said acid can be reacted with a mineral base or nitrogen base to form the corresponding salt or treated with an alkylation agent to form the desired ester that can be transformed by transesterification to another desired ester.

Preferably, the condensation of the condensed cyclic thio acetyl compound of Formula II, sulfur and morpholine is effected at the boiling point of the reaction mixture. The treatment of the thioamide of Formula III is effected with potassium hydroxide in a solvent such as 95% ethanol at the boiling point of the reaction mixture. The acidification of the reaction mixture is preferably effected with concentrated hydrochloric acid and the recovery of the acid of Formula I is effected by extraction with an organic solvent such as methylene chloride and evaporation of the said solvent.

The salts of the acids of Formula I can be prepared by reacting about stoichiometric amounts of the acid with a mineral or nitrogen base and preferably operating in a solvent such as water or low molecular weight aliphatic alcohols.

The esters of the acids of Formula I may be prepared by reacting the said acid with an alkanol of 1 to 5 carbon atoms in the presence of an acid catalyst and if desired the ester formed can be subjected to transesterification to form another desired ester. The monoglyceride esters of the acids of Formula I may be prepared by reacting a methyl ester of the acid with acetonide of glycerol and the acetonide of the ester formed is hydrolyzed with a mineral acid.

The analgesic, anti-inflammatory and antipyretic compositions of the invention are comprised of an effective amount of a compound of Formula I and a pharmaceutical carrier. The compositions may be in the form of injectable solutions or suspensions, in ampoules or multiple dose flacons or in the form of simple tablets, dragees, capsules, gels, granules, suppositories, lotions, pomades, creams or gelatin-coated pills. The usual individual dose is 0.05 to 0.5 g. in the adult.

The pharmaceutical carrier may be any of the excipients commonly used such as talc, arabic gum, lactose, amidon, magnesium stearate, cocoa butter, aqueous or non-aqueous vehicles, fatty substances of vegetable or animal origin, paraffin derivatives, glycols, various wetting agents, dispersants or emulsifiers and/or stabilizers.

The compositions have the advantage of having a very low toxicity and due to their desired activity are useful for the treatment of acute or chronic rheumatism affections, of arthritis, arthrosis, lumbago, traumatic pain, neuralgia, dental or post-operative pain or febrile affections.

The novel method of the invention for treating pain, inflammation and fever in warm-blooded animals comprises administering to warm-blooded animals an effective amount of a compound of Formula I. The compounds may be administered orally, parenterally, rectally, permucously or topically. The usual daily dose is 1.60 to 33.5 mg./kg. depending upon the method of administration and the specific compound.

In the following examples, there are described several preferred embodiments to illustrate the invention. However, it should be understood that the invention is not intended to be limited to the specific embodiments.

EXAMPLE I

Preparation of (2,3-dihydro-5-benzo(b)thiophene) acetic acid

A mixture of 26.2 g. (0.147 mole) of (2,3-dihydro-5-benzo[b]thienyl)methyl ketone, 7.1 g. of (0.222 mole) of sulfur and 40 cc. of morpholine was refluxed for 16 hours and the hot mixture was added to 150 cc. of 95% ethanol. After cooling the reaction mixture to room temperature, the mixture was vacuum filtered and the precipitate was washed with 20 cc. of 95% ethanol and dried under reduced pressure in an oven at 50° C. to obtain 34 g. (83% yield) of 4-[2,3-dihydro-5-benzo[b]-thienyl)thioacetyl]-morpholine in the form of orange crystals melting at 142° C.

A mixture of 34 g. (0.122 mole) of 4-[2,3-dihydro-5-benzo[b]thienyl)thioacetyl]-morpholine and 60 g. (1.07 mole) of potassium hydroxide pellets dissolved in 550 cc. of 95% ethanol was refluxed for 16 hours in a three-necked balloon flask provided with mechanical agitation and a descending condenser and after cooling, 1250 cc. of water added thereto. The reaction mixture was acidified with 6 N hydrochloric acid and the oil formed was then extracted twice with methylene chloride. The combined extracts were dried over sodium sulfate and the solvent was distilled off under reduced pressure. The crystalline residue was crystallized twice from isopropyl alcohol to obtain 10 g. (42% yield) of (2,3-dihydro-5-benzo[b]thiophene)acetic acid in the form of bright yellow crystals melting at 140° C. on a heated microscope platform.

*Analysis.*—Calc'd for $C_{10}H_{10}O_2S$ (percent): C, 61.9; H, 5.2. Found (percent): C, 62.0; H, 5.2.

As far as is known, this compound is not described in the literature.

EXAMPLE II

Preparation of 6-thio chroman-acetic acid

A mixture of 144 g. (0.75 mole) of methyl 6-thiochroman ketone, 39 g. (1.22 mole) of sulfur and 220 cc. of morpholine was refluxed for 16 hours and the hot mixture was added to 1 liter of 95% ethanol. After cooling to room temperature, the mixture was vacuum filtered and the precipitate was washed with 200 cc. of 95% ethanol and dried under reduced pressure in an oven at 50° C. to obtain 179 g. (82% yield) of 4-(6-thiochromanyl-thioacetyl)-morpholine in the form of orange crystals having an instantaneous melting point of 142° C.

A mixture of 179 g. (0.61 mole) of 4-(6-thiochromanyl-thioacetyl)morpholine and 318 g. (5.7 moles) of potassium hydroxide pellets dissolved in 3 liters of 95% ethanol was refluxed for 16 hours in a reactor provided with a mechanical stirrer and a descending condenser and after cooling, the reaction mixture was added to 6 liters of water. The reaction mixture was acidified with 6 N hydrochloric acid (about 800 cc.) and was extracted once with 3 liters of methylene chloride and twice with one liter of said solvent. The combined extracts were dried by filtration through sodium sulfate and the solvent was distilled off under reduced pressure. The crystalline residue was crystallized twice from a acetone-cyclohexan mixture to obtain 87.2 g. (68% yield) of 6-thiochroman-acetic acid in the form of sand-yellow crystals melting at 120° C. (capillary tube).

*Analysis.*—Calc'd for $C_{11}H_{12}O_2S$ (percent): C, 63.5; H, 5.8. Found (percent): C, 63.6; H, 5.9.

As far as is known, this compound is not described in the literature.

EXAMPLE III

Preparation of (2,3,4,5-tetrahydro-7-benzo[b]thiepin) acetic acid

Using the procedure of the first paragraph of Example I, 17 g. (0.0825 mole) of methyl (2,3,4,5-tetrahydro-7-benzo[b]thiepinyl)ketone was reacted to obtain, after adding the reaction mixture to 95% ethanol, an insoluble oil separating from the ethanol which was used as is for the next step.

Using the procedure of the second paragraph of Example I, 14.6 g. of raw 4-[(2,3,4,5-tetrahydro-7-benzo[b]thiepinyl)-thioacetyl]-morpholine was reacted to obtain after crystallization from cyclohexane, 7.2 g. (68% yield) of (2,3,4,5-tetrahydro-7-benzo[b]thiepin)-acetic acid in the form of sand yellow crystals melting at 103° C. (capillary tube).

*Analysis.*—Calc'd for $C_{12}H_{14}O_2S$ (percent): C, 64.9; H, 6.4; S, 14.4. Found (percent): C, 64.7; H, 6.2; S, 14.5.

As far as is known, this compound is not described in the literature.

EXAMPLE IV

Preparation of diethanolamine salt of 6-thiochroman acetic acid

A solution of 1.9 g. (0.018 mole) of diethanolamine in 15 cc. of absolute ethanol was added to a solution of 3.65 g. (0.0175 mole) of 6-thiochroman-acetic acid in 125 cc. of anhydrous ether. After standing for 12 hours in the refrigerator, the mixture was vacuum filtered and the precipitate was crystallized twice from absolute ethanol to obtain 4.1 g. (75% yield) of the diethanolamine salt of 6-thiochroman-acetic acid in the form of white crystals melting at 107° C. on a heated microscope platform.

*Analysis.*—Calc'd for $C_{15}H_{23}NO_4S$ (percent): C, 57.5; H, 7.4; N, 4.5; S, 10.2. Found (percent): C, 57.7; H, 7.5; N, 4.3; S, 10.3.

As far as is known, this compound is not described in the literature.

EXAMPLE V

Preparation of methyl 6-thiochroman-acetate

A solution of 29.5 g. (0.142 mole) of 6-thiochroman-acetic acid in 300 cc. of methanol was refluxed for 5 hours while passing a current of hydrochloric acid gas therethrough and then the methanol was distilled off under reduced pressure. The residue was taken up in ether and the ether solution was washed with water, then a 5% aqueous sodium bicarbonate solution, was dried and the ether eliminated. The residue was distilled to obtain 24 g. (71% yield) of methyl 6-thiochroman-acetate in the form of a colorless liquid having a boiling point of 135–140° C. at 0.01 mm. Hg and a refractive index $n_D^{20}=1.583$.

*Analysis.*—Calc'd for $C_{12}H_{14}O_2S$ (percent): C, 64.9; H, 6.4. Found (percent): C, 64.7; H, 6.4.

As far as is known, this compound is not described in the literature.

EXAMPLE VI

Preparation of ethyl 6-thiochroman-acetate

Using the procedure of Example V, 300 cc. of absolute ethanol were reacted with 6-thiochroman-acetic acid to obtain 23.5 g. (70% yield) of ethyl 6-thiochroman-acetate in the form of a colorless liquid boiling at 210–212° C. at 0.05 mm. Hg and having a refractive index $n_D^{20}=1.571$.

*Analysis.*—Calc'd for $C_{13}H_{16}O_2S$ (percent): C, 66.1; H, 6.8; S, 13.6. Found (percent): C, 66.1; H, 6.9; S, 13.5.

As far as is known, this compound is not described in the literature.

PHARMACEUTICAL EXAMPLES

Example A

Tablets were prepared containing 200 mg. of 6-thiochroman-acetic acid and sufficient excipient to make a final tablet weighing 400 mg. The excipient was composed of lactose, amidon, talc and magnesium stearate.

Example B

Tablets were prepared containing 200 mg. of (2,3-dihydro-5-benzo[b]thiophene)-acetic acid and sufficient excipient (same as Example A) to make a tablet with a final weight of 400 mg.

Example C

Suppositories were prepared from 300 mg. of 6-thiochroman-acetic acid and sufficient suppository excipient to obtain suppositories weighing 3 g.

Example D

A pomade was prepared from 5 g. of 6-thiochroman-acetic acid and sufficient excipient to obtain 100 g. of pomade.

PHARMACOLOGICAL STUDY

(A) Analgesic activity

The analgesic activity was determined on mice using a modification of the test of Eddy [Boissier et al., Anesth. and Analgesie, vol. 13 (1956), p. 569]. The test compounds were orally administered at a dose of 200 mg./kg. in aqueous suspension containing 10% arabic gum. 30 minutes later, the animal is placed in contact with a surface maintained at a constant temperature of 64° C. and then the time lapsing before the exterior reaction of pain is noted (licking of the forepaws). The activity of the test compound is determined as the percentage of lengthening of the time of pain reaction and the percentage is evaluated as the difference between the reaction of treated animals and control animals, relating this difference to the average reaction time in control animals.

A second analgesic test was used with phenyl benzoquinone using the technique of Siegmund et al. [Proc. Soc. Exper. Biol., vol. 95 (1957), p. 729]. The test compounds were orally administered to groups of 3 mice at varying dosages of 12.5, 50, 200 and 800 mg./kg. 15 minutes later, each animal received intraperitoneally 0.25 cc. of a solution of 20 mg. of phenyl benzoquinone in 100 cc. Then, the number of stretching movements executed by each group of animals from the fifth to tenth minute after the intraperitoneal injection were counted. The degree of protection given by the administration of the test compound was calculated as follows:

Percent protection $$= \left[ 1 - \frac{\text{No. of stretchings of treated animals}}{\text{No. of stretchings of controls}} \right] \times 100$$

(B) Anti-inflammatory activity

The anti-inflammatory activity was determined against carragheenin in rats with the technique of Benitz et al. [Arch. Inter. Pharmacodyn. & Therap., vol. 144 (1963), pp. 185–195]. Groups of 5 rats weighing about 50 g. each were given orally 200 mg./kg. of the test compound as a suspension in water containing 10% by weight arabic gum. The said dose was administered in 2 doses with the first being in the morning and the second being 6 hours later in the afternoon with the volume for each feeding being 0.25 cc. per 100 g. of body weight. On the next day, the said treatment was repeated and immediately after the first feeding of the animals, 0.5 cc. of a physiological solution containing 2% of carragheenin was administered subcutaneously in the dorsal-lumbar region. On the third day, 24 hours after the carragheenin administration, the animals were sacrificed by chloroform inhalation and the skin of each was peeled back and the abscess formed was withdrawn. The exudate and the gelatinous substance isolated were immediately weighed. The activity of the compounds is expressed as a percentage of inhibition of the abscess weight withdrawn from the control animals and the treated animals.

(C) Anti-pyretic activity

The anti-pyretic activity of the compounds was determined by evaluating the action in rats weighing about 250 to 300 g. against pyrexic provoked by subcutaneous injection of a suspension of baker's yeast at the rate of 1 cc. per 100 g. of animal weight (12% yeast suspended in a 10% arabic gum solution). The test compounds were orally administered at a dose of 200 mg./kg. and the rectal temperatures were measured every hour up to six hours. The percentage of inhibition of experimental hyperthermia was expressed as follows:

$$\text{Percent inhibition} = \left[ 1 - \frac{\epsilon\Delta \text{ treated animals}}{\epsilon\Delta \text{ control animals}} \right] \times 100$$

$\Delta$ is the hourly algebraic variation of the evaluated temperature with respect to the initial temperature.

The compounds tested were 2,3-dihydro-5-benzo[b]thiophene-acetic acid [2117–03], 6-thiochroman-acetic acid [2117–02] and (2,3,4,5 - tetrahydro - 7 - benzo[b]thiepin)acetic acid [2117–10] and the results are reported in Table I.

TABLE I

| Product | Eddy test, percent | Phenylbenzoquinone mg./ g. | | | | Percent inhibition of abscess | Percent inhib. of hyperther. |
|---|---|---|---|---|---|---|---|
| | | 800 | 200 | 50 | 12.5 | | |
| 2117–03 | 108 | 100 | 62 | 48 | 44 | 42 | 90 |
| 2117–02 | 39 | 100 | 46 | 63 | 36 | 33 | 100 |
| 2117–10 | 47 | 97 | 25 | 5 | | 27 | 21 |

(D) Toxicity

The toxicity of the compounds was tested orally on mice and $DL_{50}$ dose was superior to 2 g./kg.

Various modifications of the compositions and method of the invention may be made without departing from the spirit or scope thereof and it is to be understood that the invention is intended to be limited only as defined in the appended claims.

We claim:

1. A 6-thiochroman-acetic acid compound of the formula

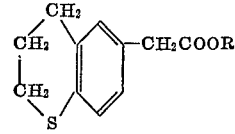

wherein R is selected from the group consisting of hydrogen, alkyl and hydroxy alkyl of 1 to 5 carbon atoms and non-toxic, pharmaceutically acceptable metal salts and nitrogen base salts.

2. A compound of claim 1 which is 6-thiochroman-acetic acid.

3. A compound of claim 1 which is the methyl ester of 6-thiochroman-acetic acid.

4. A compound of claim 1 which is the ethyl ester of 6-thiochroman-acetic acid.

5. A compound of claim 1 which is the glycerol ester of 6-thiochroman-acetic acid.

6. A compound of claim 1 which is the diethanolamine salt of 6-thiochroman-acetic acid.

References Cited

Joshi et al.: Chem. Abs. 57:9727 (October 1962).

HENRY R. JILES, Primary Examiner

C. M. S. JAISLE, Assistant Examiner

U.S. Cl. X.R.

260—327 B, 247.1, 330.5; 424—275